Nov. 26, 1940.  A. L. McHUGH  2,222,779

SEALING DEVICE

Filed Aug. 15, 1938

INVENTOR
Anthony L. McHugh
BY
HIS ATTORNEY.

Patented Nov. 26, 1940

2,222,779

UNITED STATES PATENT OFFICE 2,222,779

SEALING DEVICE

Anthony L. McHugh, Easton, Pa., assignor to Ingersoll-Rand Company, Jersey City, N. J., a corporation of New Jersey Application August 15, 1938, Serial No. 224,897

3 Claims. (Cl. 286—7)

This invention relates to sealing devices, and more particularly to a sealing device for a rotary member, as for example the shaft of a centrifugal pump.

One object of the invention is to make possible the expeditious renewal of the surfaces relied upon for effecting a seal and thereby avoid long periods of idleness of the machine to which the invention is applied.

Another object is to enable the sealing surfaces to be cheaply replaced.

Other objects will be in part obvious and in part pointed out hereinafter.

Figure 1:
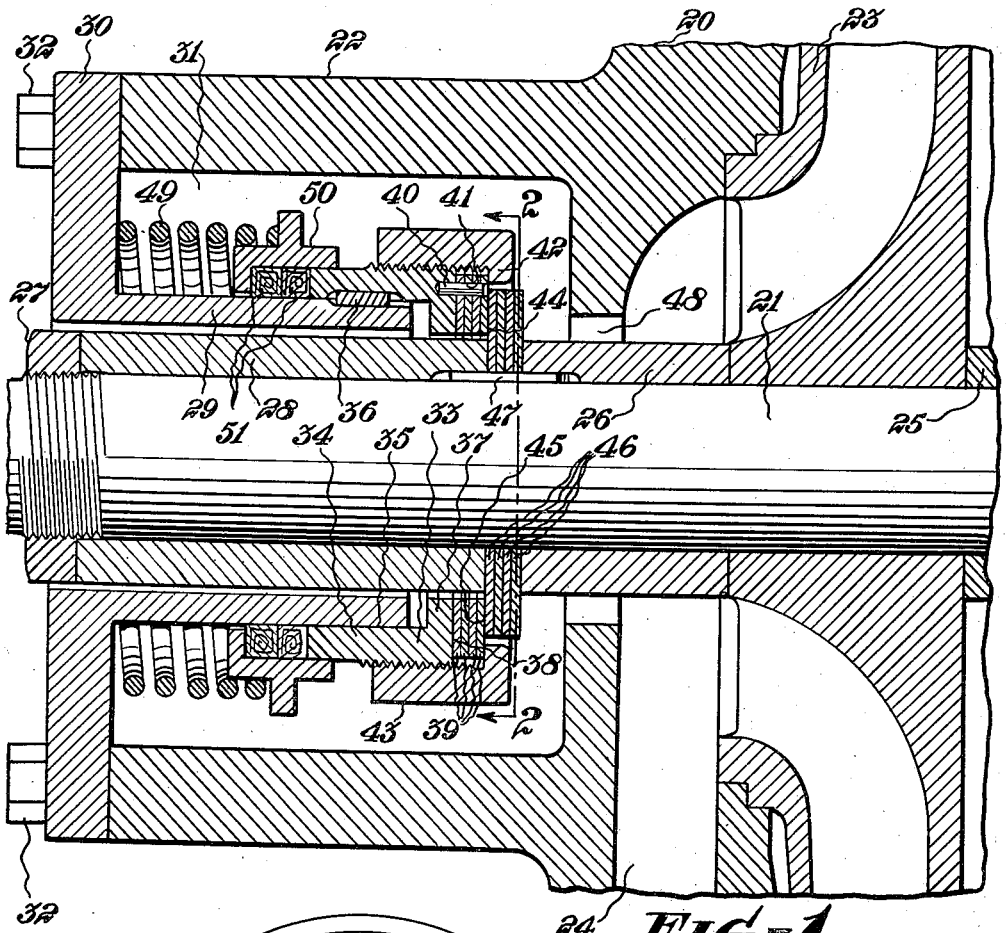
Figure 2:
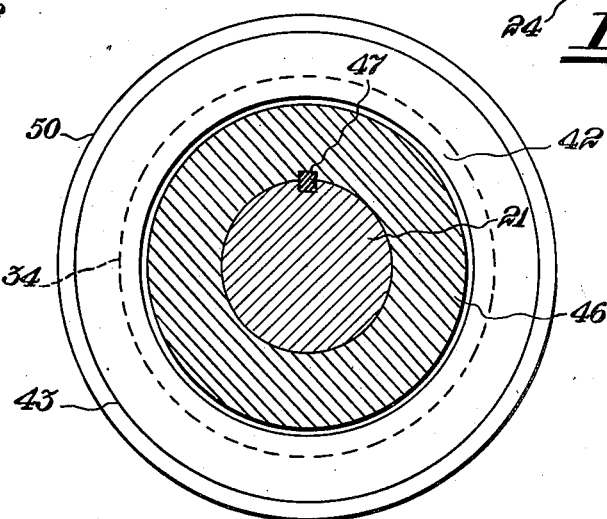

In the drawing accompanying this specification and in which similar reference numerals refer to similar parts, Figure 1 is a longitudinal elevation, partly broken away, of the inlet side of a pump equipped with a sealing device constructed in accordance with the practice of the invention, and Figure 2 is a transverse view taken through Figure 1 on the line 2—2.

Referring more particularly to the drawing, 20 designates the casing of a pump and 21 a rotary shaft which extends longitudinally through the casing 20 and through a stuffing box 22 on the end of the casing 20.

The shaft 21 carries an impeller 23 for pumping liquid from the inlet chamber 24 located adjacent the stuffing box 22. The impeller 23 may be secured to the shaft 21 in any suitable manner, as by clamping it between a pair of sleeves 25 and 26 mounted directly upon the shaft. The clamping force required for this purpose is supplied by a nut 27 threaded upon the shaft adjacent the outer end of the stuffing box 22 so that it will be readily accessible from the exterior of the pump. A sleeve 28 disposed on the shaft 21 serves as a spacer for transmitting the force of the nut 27 to the sleeve 26.

The sealing device constructed in accordance with the practice of the invention is shown arranged in the stuffing box 22. It comprises a sleeve 29 which loosely encircles the sleeve 28 and has a lateral flange 30 that forms a closure for the interior or chamber 31 of the stuffing box. The flange 30 seats against the outer end of the stuffing box and is secured thereto by bolts 32.

On the inner or free end of the sleeve 29 is a carrier designated, in its entirety, by 33 and comprising a sleeve 34 of which the inner surface 35 slidably engages the periphery of the sleeve 29. A key 36 embedded in the sleeves 29 and 34 serves to prevent relative rotary movement between these elements, and on the end of the sleeve 34 confronting the inlet chamber 24 is an internal flange 37 of which the outermost surface 38 serves as a seat for one of a group of sealing plates 39.

The sealing plates encircle the sleeve 28 and are supported concentrically with said sleeve by pins 40 seated in the end of the sleeve 34 and extending through apertures 41 in the plates 39. The plates 39 are preferably in the form of thin discs seated one against the other and are clamped securely in position by the flange 42 of a sleeve 43 threaded on the sleeve 34.

Any suitable number of sealing plates 39 may be initially clamped against the end of a sleeve 34, and the exposed surface of the end unit of the plates 39 constitutes a sealing surface 44 which cooperates with a surface 45 of the adjacent unit of a group of sealing discs 46 clamped between the sleeves 28 and 26 on the shaft. The discs 46 may, in all essential respects, be similar to the plates 39 and are secured against rotary movement with respect to the shaft 21 by a key 47 embedded in the shaft 21, the discs 46 and also in the sleeves 28 and 26.

The sealing surfaces 44 and 45 are exposed directly to fluid entering the chamber 31 through an aperture 48 in the wall of the casing separating the inlet chamber 24 from the chamber 31, and the fluid which passes between the surfaces 44 and 45 flows along the sleeve 28 to the exterior of the stuffing box 22.

In the arrangement shown the sealing elements carried by the shaft 21 are capable of rotary movement only, that is to say, they rotate with the shaft but are fixed against longitudinal movement with respect to the shaft. The plates 39, on the other hand, are capable of some degree of endwise movement with respect to the shaft to provide the space or clearance necessary for the passage of a slight amount of liquid between the sealing surfaces in order to protect them against undue wear.

The end surfaces of the elements directly associated with the plates 39 including the carrier 33 are preferably, therefore, so proportioned that the pressure of the liquid in the chamber will tend to move the carrier and the plates 39 toward the plates 46. This pressure differential may be of any desired value and is augmented, in the present instance, by the force of a spring 49 disposed about the sleeve 29. The spring 49 acts against a gland 50 slidable on the sleeve 34 and the pressure of the spring 49 is transmitted to the sleeve 34 by packing members 51 arranged in the gland 50 and seating on the periphery of the sleeve 29 to prevent leakage of liquid through the flange and along the adjacent end of the sleeve 34.

In practice, the sealing plates 39 and the sealing discs 46 are assembled in groups on the carrier and the shaft, respectively, in the manner described, and the opposed surfaces of the end plate 39 and the contiguous disc 46 serve to control leakage of liquid from the chamber 31. Whenever an active sealing plate 39 becomes worn unduly the sleeve 29 and the carrier 33 are withdrawn from the chamber 31. The sleeve 43 is then unthreaded from the sleeve 34 and the worn end plate 39 is cut or split and removed from the assembly. Thereafter, the sleeve 43 is again threaded in position to clamp the remaining plates 39 securely in position.

The carrier and the sleeve 29 are next placed in their correct assembled positions in the pump and the sealing function will then be performed by the second plate of the group. This operation may be performed each time a sealing plate 39 becomes worn and until all the plates have been used after which the carrier will, of course, have to be completely removed from the pump to receive a new group of plates.

Whenever the active unit of the group of discs 46 becomes worn the sleeve 29 and the carrier 33 are also removed from the stuffing box. The nut 27 is then unthreaded to permit withdrawal of the sleeve 28 and the worn plate. The latter may then be split and distorted to permit of its removal from the shaft. Thereafter, the sleeve 28 is again forced against the group of discs by means of the nut 27 and in this way a new sealing surface 45 is provided to cooperate with the sealing surface 44.

I claim:

1. In a sealing device, the combination of a casing and a rotor, a sealing surface on the rotor, a carrier movable longitudinally of the casing, a sealing disc on the carrier, clamping means adjustable on and encircling the carrier for securing the sealing disc fixedly to the carrier, and means for effecting a seal between the casing and the carrier.

2. In a sealing device, the combination of a casing and a rotor, a sealing plate on the rotor, clamping means for securing the sealing plate to the rotor, means threadedly connected to the rotor for actuating the clamping means, a carrier in the casing, a sealing disc on the carrier to cooperate with the sealing plate to effect a seal, means for clamping the sealing disc to the carrier, and means for effecting a seal between the casing and the carrier.

3. In a sealing device, the combination of a casing and a rotor, a sealing plate on the rotor, an abutment on the rotor for the plate, means for clamping the plate against the abutment, a carrier slidable longitudinally of the rotor, a sealing disc on the carrier to cooperate with the sealing plate to effect a seal, a sleeve threaded on the carrier to clamp the sealing disc to the carrier, and means for effecting a seal between the casing and the carrier.

ANTHONY L. McHUGH.